US010830345B1

(12) United States Patent
Liberatore et al.

(10) Patent No.: US 10,830,345 B1
(45) Date of Patent: Nov. 10, 2020

(54) BRAKE-DEPENDENT CLUTCH HOLDING PRESSURE WHILE TRANSMISSION IS IN NEUTRAL

(71) Applicants: Jacob Liberatore, Troy, MI (US); Nathan J Saliga, Clarkston, MI (US); Jeffrey E Ross, Ortonville, MI (US)

(72) Inventors: Jacob Liberatore, Troy, MI (US); Nathan J Saliga, Clarkston, MI (US); Jeffrey E Ross, Ortonville, MI (US)

(73) Assignee: FCA US LLC, Auburn Hills, MI (US)

( * ) Notice: Subject to any disclaimer, the term of this patent is extended or adjusted under 35 U.S.C. 154(b) by 47 days.

(21) Appl. No.: 16/385,710

(22) Filed: Apr. 16, 2019

(51) Int. Cl.
*F16H 61/20* (2006.01)
*F16H 3/66* (2006.01)
*F16H 61/04* (2006.01)
*B60T 13/68* (2006.01)
*B60T 13/74* (2006.01)

(52) U.S. Cl.
CPC ............ *F16H 61/20* (2013.01); *F16H 3/663* (2013.01); *F16H 61/04* (2013.01); *F16H 2061/207* (2013.01); *F16H 2306/46* (2013.01); *F16H 2312/04* (2013.01); *F16H 2312/06* (2013.01)

(58) Field of Classification Search
CPC .......... F16H 61/20; F16H 3/663; F16H 61/04; F16H 2061/207; F16H 2306/46; F16H 2312/04; F16H 2312/06; F16H 2061/0485; F16H 2061/0488; F16H 61/06; B60W 2510/182; B60W 2710/188; B60T 13/686; B60T 13/745; B60T 13/746; Y10T 477/6388
See application file for complete search history.

(56) References Cited

U.S. PATENT DOCUMENTS

| 5,046,178 | A | 9/1991 | Hibner et al. | |
|---|---|---|---|---|
| 5,833,572 | A | 11/1998 | Leising et al. | |
| 6,308,125 | B1 * | 10/2001 | Gleason | B60W 10/06 701/53 |
| 6,358,184 | B1 | 3/2002 | Steinmetz et al. | |
| 8,392,076 | B2 * | 3/2013 | Kobayashi | F16H 61/20 701/51 |

(Continued)

FOREIGN PATENT DOCUMENTS

DE 102014214050 A1 1/2016

OTHER PUBLICATIONS

International Search Report and Written Opinion dated Jul. 8, 2020 for International Application No. PCT/US2020/028047, International Filing Date Apr. 14, 2020.

*Primary Examiner* — Tinh Dang
(74) *Attorney, Agent, or Firm* — Ralph E Smith

(57) ABSTRACT

Systems and methods for performing a garage shift of an automatic transmission of a vehicle comprise maintaining a clutch at a first holding pressure while the transmission is in a neutral gear and a brake input signal satisfies a threshold and maintaining the clutch at a lower second holding pressure while the transmission is in the neutral gear and the brake input signal satisfies the threshold to mitigate or eliminate causing drive torque to be transferred from a torque generating system of the vehicle to its driveline via the transmission. When the brake input signal satisfies the threshold and a shift from the neutral gear to a non-neutral gear is requested, the garage shift is then executed.

18 Claims, 3 Drawing Sheets

(56) References Cited

U.S. PATENT DOCUMENTS

| | | | |
|---|---|---|---|
| 9,020,712 B2 * | 4/2015 | Koike | F16H 63/486 |
| | | | 701/53 |
| 9,365,201 B2 * | 6/2016 | Shattuck | B60W 10/06 |
| 9,964,162 B2 * | 5/2018 | Shattuck | F16H 61/0059 |
| 2009/0131216 A1 | 5/2009 | Matsubara et al. | |
| 2010/0304928 A1 | 12/2010 | Lochocki, Jr. et al. | |
| 2018/0118214 A1 | 5/2018 | McDonnell et al. | |

* cited by examiner

BRAKE-DEPENDENT CLUTCH HOLDING PRESSURE WHILE TRANSMISSION IS IN NEUTRAL

FIELD

The present application generally relates to transmission control systems and, more particularly, to systems and methods for brake-dependent clutch holding pressure while a transmission is in neutral.

BACKGROUND

An automatic transmission of a vehicle transfers drive torque generated by a torque generating system (e.g., an engine, an electric motor, or combinations thereof) to a driveline. While the transmission is in a neutral gear, one clutch is held at a holding pressure to prepare for a garage shift (a shift from neutral/park into drive or reverse). In conventional transmission control systems, this holding pressure is sometimes potentially high, which could potentially cause torque to be transferred to the driveline and potentially cause the vehicle to creep slightly. Accordingly, while conventional transmission control systems do work well for their intended purpose, there remains a need for improvement in the relevant art.

SUMMARY

According to one example aspect of the invention, a control system for an automatic transmission of a vehicle is presented. In one exemplary implementation, the system comprises: a brake pedal sensor configured to generate a brake input signal indicative of an input provided by a driver of the vehicle via a brake pedal, a gear selector sensor configured to monitor a gear selected by the driver of the vehicle via a gear selector, and a controller configured to: detect when the transmission is in a neutral gear, when the transmission is in the neutral gear and the brake input signal satisfies a brake threshold, command the transmission to hold a clutch at a first holding pressure to prepare for a garage shift from the neutral gear into a non-neutral gear, when the transmission is in the neutral gear and the brake input signal does not satisfy the brake threshold, command the transmission to hold the clutch at a second holding pressure that is less than the first holding pressure, wherein the second holding pressure is configured to mitigate or eliminate causing drive torque to be transferred from a torque generating system of the vehicle to a driveline of the vehicle via the transmission when the transmission is in the neutral gear and the brake input signal does not satisfy the brake threshold, and in response to a selection of the non-neutral gear by the driver of the vehicle, command the transmission to execute the garage shift from the neutral gear into the non-neutral gear.

In some implementations, the brake input signal is a brake pressure signal and the brake threshold is one or more brake pressure thresholds. In some implementations, the controller is configured to determine the second holding pressure based on the brake pressure, wherein the second holding pressure increases as the brake pressure increases.

In some implementations, the brake inputs signal is an ON/OFF state signal and the brake threshold is the ON state. In some implementations, the second holding pressure is predetermined.

In some implementations, the second clutch holding pressure is greater than zero. In some implementations, the non-neutral gear is a reverse gear. In some implementations, the non-neutral gear is a drive gear.

In some implementations, the transmission is an eight-speed transmission comprising three clutches needed for the garage shift from the neutral gear to the drive gear, and wherein the clutch is one of the three clutches.

According to another example aspect of the invention, a method of controlling a garage shift of an automatic transmission of a vehicle is presented. In one exemplary implementation, the method comprises: receiving, by a controller and from a brake pedal sensor, a brake input signal indicative of an input provided by a driver of the vehicle via a brake pedal, receiving, by the controller and from a gear selector sensor, a gear selected by the driver of the vehicle via a gear selector, detecting, by the controller, when the transmission is in a neutral gear, when the transmission is in the neutral gear and the brake input signal satisfies a brake threshold, commanding, by the controller, the transmission to hold a clutch at a first holding pressure to prepare for a garage shift from the neutral gear into a non-neutral gear, when the transmission is in the neutral gear and the brake input signal does not satisfy the brake threshold, commanding, by the controller, the transmission to hold the clutch at a second holding pressure that is less than the first holding pressure, wherein the second holding pressure is configured to mitigate or eliminate causing drive torque to be transferred from a torque generating system of the vehicle to a driveline of the vehicle via the transmission when the transmission is in the neutral gear and the brake input signal does not satisfy the brake threshold, and in response to a selection of the non-neutral gear by the driver of the vehicle, commanding, by the controller, the transmission to execute the garage shift from the neutral gear into the non-neutral gear.

In some implementations, the brake input signal is a brake pressure signal and the brake threshold is one or more brake pressure thresholds. In some implementations, the method further comprises determining, by the controller, the second holding pressure based on the brake pressure, wherein the second holding pressure increases as the brake pressure increases.

In some implementations, the brake input signal is an ON/OFF state signal and the brake threshold is the ON state. In some implementations, the second holding pressure is predetermined.

In some implementations, the second clutch holding pressure is greater than zero. In some implementations, the non-neutral gear is a reverse gear. In some implementations, wherein the non-neutral gear is a drive gear.

In some implementations, the transmission is an eight-speed transmission comprising three clutches needed for the garage shift from the neutral gear to the drive gear, and wherein the clutch is one of the three clutches.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DESCRIPTION

As discussed above, conventional transmission control systems sometimes command too high of a holding pressure of a clutch in preparation for a garage shift from a neutral gear into a non-neutral gear (e.g., drive or reverse), which could potentially cause drive torque to be transferred from a torque generating system of the vehicle to its driveline via the transmission and could potentially cause the vehicle to roll, which is undesirable. For example, in an eight-speed automatic transmission, there could be three clutches required to transition from the neutral gear into a drive gear (e.g., $1^{st}$ gear). In order to provide a quicker shift, one of these clutches could be held at a holding pressure that is as high as possible but not causing engagement. These scenarios, in particular, could potentially result in drive torque to be transferred to the driveline and could potentially cause the vehicle to roll, which is also known as neutral drag or creep.

Accordingly, systems and methods for brake-dependent clutch holding pressure while a transmission is in neutral are presented. More specifically, when the transmission is in a neutral gear and a brake input signal satisfies a threshold, the clutch is maintained at a first holding pressure in preparation for a garage shift. This clutch could be one of a plurality of clutches needed to execute the garage shift. When the transmission is in the neutral gear and the brake input does not satisfy the threshold, however, the clutch is maintained at a second holding pressure that is less than the first holding pressure such that the vehicle is unlikely to creep. This second holding pressure is configured to mitigate or eliminate drive torque being transferred to the driveline via the transmission and could be either predetermined or could vary based on the degree of brake pressure being applied. For example, as brake pressure increases, the second holding pressure could increase, and vice-versa. The terms "neutral" and "neutral gear" as used herein refer to both neutral and park gears of the transmission, although while in park there is a parking brake applied. The terms "non-neutral" and "non-neutral gear" as used herein refers to both drive and reverse gears of the transmission.

Figure 1:
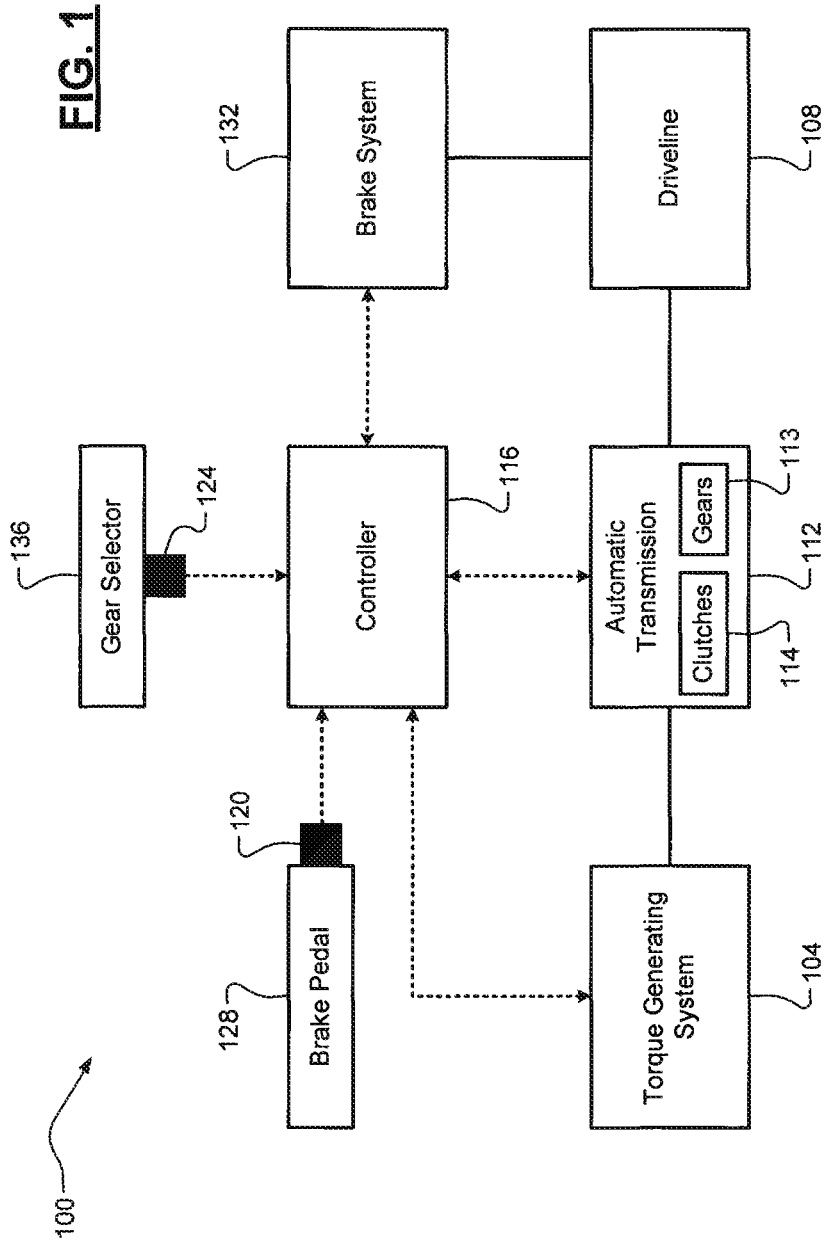
FIG. 1 is a functional block diagram of an example vehicle according to the principles of the present disclosure.

Referring now to FIG. 1, a functional block diagram of an example vehicle 100 is illustrated. The vehicle 100 comprises a torque generating system 104 (e.g., an engine, an electric motor, or combinations thereof) that generates drive torque. The drive torque generated by the torque generating system 104 is transferred to a driveline 108 of the vehicle 100 via an automatic transmission 112 comprising a plurality of gears 113 (e.g., PRNDL) and a plurality of clutches 114. In one exemplary implementation, the transmission 112 is an eight-speed automatic transmission having three clutches needed to execute a garage shift from a neutral gear into a drive gear (e.g., first gear). The torque generating system 104 and the transmission 112 are controlled by a controller 116. For purposes of the present disclosure, the controller 116 receives driver input via a brake pedal sensor 120 (a brake input signal) and a gear selector sensor 124, but it will be appreciated that the controller 116 could receive many other inputs from other devices/sensors (e.g., a driver input via an accelerator pedal indicative of a desired drive torque to be generated by the torque generating system 104). The brake pedal sensor 120 monitors driver input via a brake pedal 128 and the controller 116 controls a brake system 132 accordingly. Similarly, the gear selector sensor 124 monitors driver input via a gear selector 136 (a shift lever, a rotary knob, etc.) and the controller 116 controls the transmission 112 accordingly.

Based on the inputs from the brake pedal sensor 120 and the gear selector sensor 124, the controller 116 commands the transmission 112 to maintain a clutch one of a plurality of different holding pressures. The input from the brake pedal sensor 120 could be a binary signal (e.g., an ON/OFF brake switch) or a pressure signal indicative of a degree of brake pressure being applied by the driver via the brake pedal 128. When the brake satisfies a threshold (e.g., an OFF state or a brake pressure not exceeding one or more brake pressure thresholds) and the transmission 112 is in the neutral gear, the clutch holding pressure is temporarily decreased from a first holding pressure P1 to a lesser (non-zero) second holding pressure P2. The first holding pressure P1 has a magnitude appropriate for quickly executing a garage shift from the neutral gear into a non-neutral gear, whereas the second holding pressure P2 has a magnitude that is unlikely to cause drive torque to be transferred from the torque generating system 104 of the vehicle 100 to its driveline 108 via the transmission 112. The second holding pressure P2 should be greater than zero, however, such that it can be quickly ramped back up to P1 when the brakes are applied and the garage shift is requested. As previously mentioned, the second holding pressure P2 could be a single predetermined value (e.g., for ON/OFF brake switch inputs) or could vary based on the degree of brake pressure being applied such that, as the degree of brake pressure increases, the second holding pressure P2 increases, and vice-versa.

Figure 2:
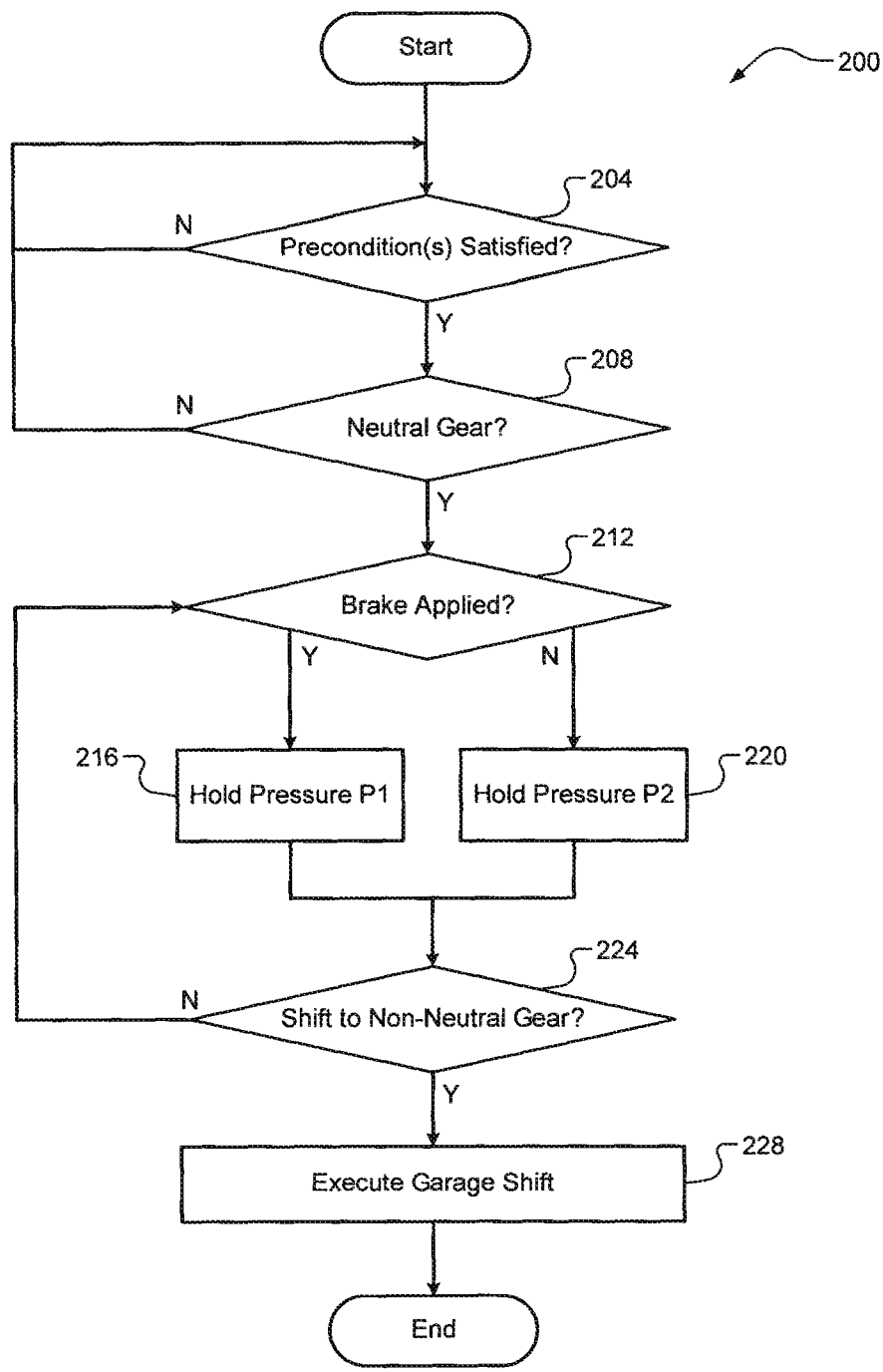
FIG. 2 is a flow diagram of an example brake-dependent clutch holding pressure control method while a transmission is in neutral according to the principles of the present disclosure.
Figure 3:
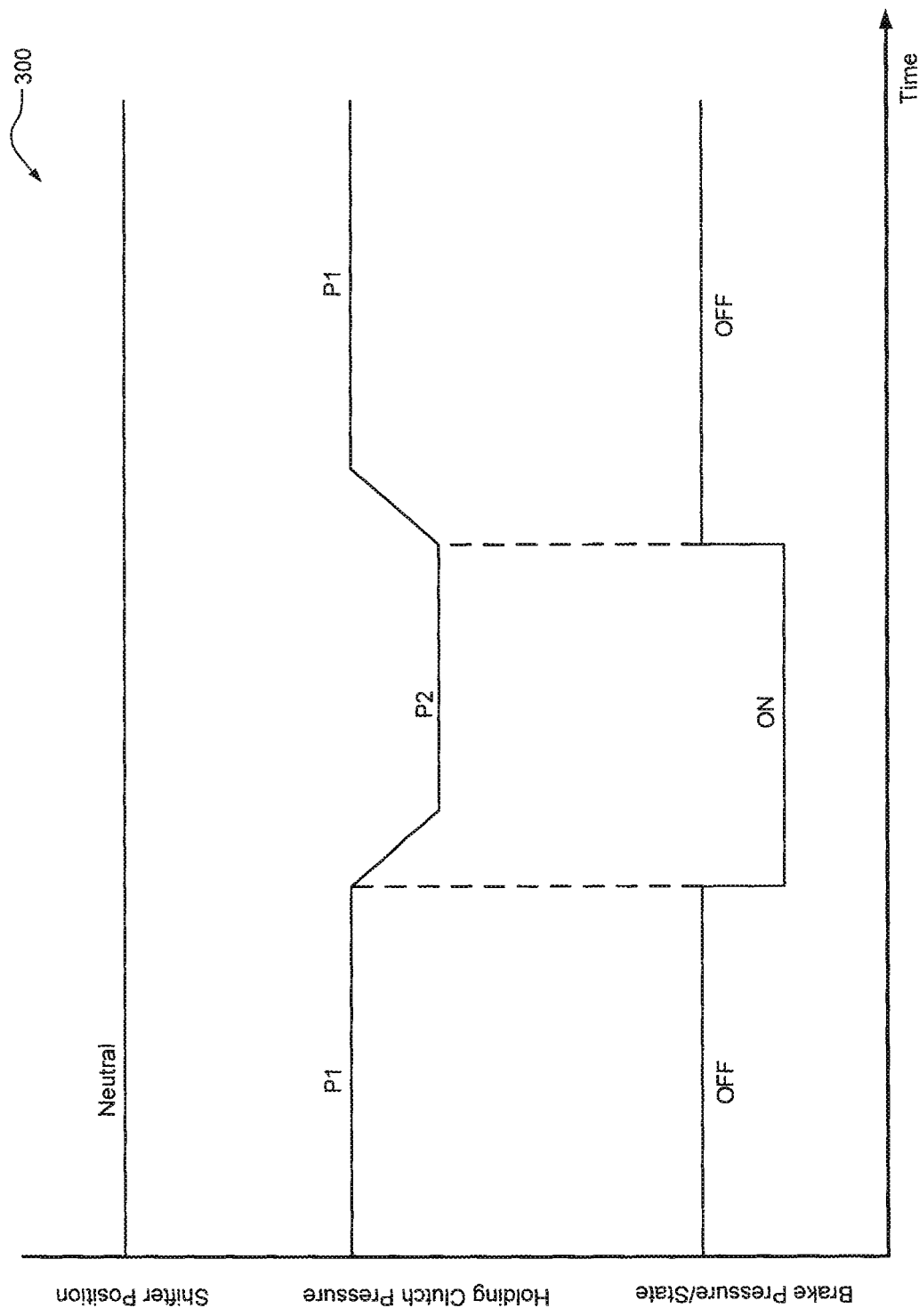
FIG. 3 is a plot of brake pressure/state and clutch holding pressure during the control method according to the principles of the present disclosure.

Referring now to FIGS. 2-3, a flow diagram of an example brake-dependent clutch holding pressure control method 200 while a transmission is in neutral and a corresponding plot of brake pressure and clutch holding pressure are illustrated. For reference, the components of vehicle 100 will be referenced in describing the method 200 and the plot 300, but it will be appreciated that the techniques of the present disclosure are applicable to any suitable vehicle having an automatic transmission. At 204, the controller 116 determines whether a set of one or more optional preconditions are satisfied. This could include, for example only, the engine 104 being on and no malfunctions being present that would otherwise prevent operation of the vehicle 100. When satisfied, the method 200 proceeds to 208. Otherwise, the method 200 ends or returns to 204. At 208, the controller 116 determines whether the transmission 112 is in the neutral gear (Neutral). When true, the method 200 proceeds to 212. Otherwise, the method 200 ends or returns to 204 or 208. At 212, the controller 116 determines whether the brake input satisfies a threshold. This threshold, when not satisfied, is indicative of a need to temporarily decrease the clutch holding pressure from P1 to a lesser second holding pressure P2 in order to prevent a possible neutral drag scenario. For brake inputs indicative of brake pressure being applied by the driver, this could also include determining the magnitude of the second holding pressure P2, with the second holding pressure increasing as brake pressure increases and vice-versa. When true, the method 200 proceeds to 216. Otherwise, the method 200 proceeds to 220.

At 216, the controller 116 commands the transmission 112 to maintain the clutch at the first holding pressure (P1) in preparation for the garage shift to the non-neutral gear and the method 200 then proceeds to 224. At 220, the controller 116 commands the transmission to maintain the clutch at the lesser second holding pressure (P2) that is unlikely to cause drive torque to be transferred from the torque generating system 104 to the driveline 108 via the transmission 112. It will be appreciated that the clutch holding pressure could be ramped up/down between P1 and P2 at any suitable rate. At 224, the controller 116 determines whether the garage shift into the non-neutral gear is about to be performed (e.g., is requested via the gear selector 136). When true, the method 200 proceeds to 228. Operation 224 may further include the brake being applied (see 212) such that the garage shift cannot be performed until the brakes are applied, and thus the method 200 could return to 212 when the garage shift is requested but the brakes are not applied. At 228, the garage shift from the neutral gear into the non-neutral gear (e.g., drive or reverse) is executed. This could include, for example only, the controller 116 commanding the transmission to release the on-coming clutch pressure to engage the non-neutral gear. The method 200 then ends or returns to 204 for one or more additional cycles.

It will be appreciated that the term "controller" as used herein refers to any suitable control device or set of multiple control devices that is/are configured to perform at least a portion of the techniques of the present disclosure. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present disclosure. The one or more processors could be either a single processor or two or more processors operating in a parallel or distributed architecture.

It should be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. A control system for an automatic transmission of a vehicle, the control system comprising:
    a brake pedal sensor configured to generate a brake input signal indicative of an input provided by a driver of the vehicle via a brake pedal;
    a gear selector sensor configured to monitor a gear selected by the driver of the vehicle via a gear selector; and
    a controller configured to:
        detect when the transmission is in a neutral gear;
        when the transmission is in the neutral gear and the brake input signal satisfies a brake threshold, command the transmission to hold a clutch at a first holding pressure to prepare for a garage shift from the neutral gear into a non-neutral gear;
        when the transmission is in the neutral gear and the brake input signal does not satisfy the brake threshold, command the transmission to hold the clutch at a second holding pressure that is less than the first holding pressure, wherein the second holding pressure is configured to mitigate or eliminate causing drive torque to be transferred from a torque generating system of the vehicle to a driveline of the vehicle via the transmission when the transmission is in the neutral gear and the brake input signal does not satisfy the brake threshold; and
        in response to a selection of the non-neutral gear by the driver of the vehicle, command the transmission to execute the garage shift from the neutral gear into the non-neutral gear.

2. The system of claim 1, wherein the brake input signal is a brake pressure signal and the brake threshold is one or more brake pressure thresholds.

3. The system of claim 2, wherein the controller is configured to determine the second holding pressure based on the brake pressure, wherein the second holding pressure increases as the brake pressure increases.

4. The system of claim 1, wherein the brake inputs signal is an ON/OFF state signal and the brake threshold is the ON state.

5. The system of claim 4, wherein the second holding pressure is predetermined.

6. The system of claim 1, wherein the second clutch holding pressure is greater than zero.

7. The system of claim 1, wherein the non-neutral gear is a reverse gear.

8. The system of claim 1, wherein the non-neutral gear is a drive gear.

9. The system of claim 8, wherein the transmission is an eight-speed transmission comprising three clutches needed for the garage shift from the neutral gear to the drive gear, and wherein the clutch is one of the three clutches.

10. A method of controlling a garage shift of an automatic transmission of a vehicle, the method comprising:
    receiving, by a controller and from a brake pedal sensor, a brake input signal indicative of an input provided by a driver of the vehicle via a brake pedal;
    receiving, by the controller and from a gear selector sensor, a gear selected by the driver of the vehicle via a gear selector;
    detecting, by the controller, when the transmission is in a neutral gear;
    when the transmission is in the neutral gear and the brake input signal satisfies a brake threshold, commanding, by the controller, the transmission to hold a clutch at a first holding pressure to prepare for a garage shift from the neutral gear into a non-neutral gear;
    when the transmission is in the neutral gear and the brake input signal does not satisfy the brake threshold, commanding, by the controller, the transmission to hold the clutch at a second holding pressure that is less than the first holding pressure, wherein the second holding pressure is configured to mitigate or eliminate causing drive torque to be transferred from a torque generating system of the vehicle to a driveline of the vehicle via the transmission when the transmission is in the neutral gear and the brake input signal does not satisfy the brake threshold; and
    in response to a selection of the non-neutral gear by the driver of the vehicle, commanding, by the controller, the transmission to execute the garage shift from the neutral gear into the non-neutral gear.

11. The method of claim 10, wherein the brake input signal is a brake pressure signal and the brake threshold is one or more brake pressure thresholds.

12. The method of claim 11, further comprising determining, by the controller, the second holding pressure based on the brake pressure, wherein the second holding pressure increases as the brake pressure increases.

13. The method of claim 10, wherein the brake input signal is an ON/OFF state signal and the brake threshold is the ON state.

14. The method of claim 13, wherein the second holding pressure is predetermined.

15. The method of claim 10, wherein the second clutch holding pressure is greater than zero.

16. The method of claim 10, wherein the non-neutral gear is a reverse gear.

17. The method of claim 10, wherein the non-neutral gear is a drive gear.

18. The method of claim 17, wherein the transmission is an eight-speed transmission comprising three clutches needed for the garage shift from the neutral gear to the drive gear, and wherein the clutch is one of the three clutches.

* * * * *